US012148553B2

(12) United States Patent
Mohandas et al.

(10) Patent No.: US 12,148,553 B2
(45) Date of Patent: Nov. 19, 2024

(54) VARISTOR

(71) Applicant: TDK Electronics AG, Munich (DE)

(72) Inventors: Prahlad Malpe Mohandas, Deutschlandsberg (AT); S. Soran Nabavi, Seiersberg Pirka (AT); Alfred Hofrichter, Hartberg (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/753,580

(22) PCT Filed: Nov. 6, 2020

(86) PCT No.: PCT/EP2020/081341
§ 371 (c)(1),
(2) Date: Mar. 8, 2022

(87) PCT Pub. No.: WO2021/089816
PCT Pub. Date: May 14, 2021

(65) Prior Publication Data
US 2024/0105366 A1 Mar. 28, 2024

(30) Foreign Application Priority Data
Nov. 8, 2019 (DE) ......................... 102019130189.0

(51) Int. Cl.
*H01C 7/108* (2006.01)
*H01C 1/14* (2006.01)

(52) U.S. Cl.
CPC ............... *H01C 7/108* (2013.01); *H01C 1/14* (2013.01)

(58) Field of Classification Search
CPC . H01C 7/108; H01C 1/14; H01C 7/18; H01C 7/112
See application file for complete search history.

(56) References Cited

U.S. PATENT DOCUMENTS 4,290,041 A 9/1981 Utsumi
5,075,665 A * 12/1991 Taira ...................... H01C 7/102 338/273
(Continued)

FOREIGN PATENT DOCUMENTS

CN 102903521 A 1/2013
CN 105470685 A 4/2016
(Continued)

OTHER PUBLICATIONS

International Search Report and Written Opinion of International Searching Authority corresponding to International Patent Application No. PCT/EP2020/081341, mailed Jun. 2, 2021 (15 pages).
(Continued)

*Primary Examiner* — Kyung S Lee
(74) *Attorney, Agent, or Firm* — Nixon Peabody LLP

(57) ABSTRACT

The present disclosure specifies a varistor comprising a ceramic body, which comprises a functional ceramic, and electrodes arranged inside the ceramic body. The electrodes include non-floating electrodes, which are electrically connected to external contacts of the varistor, respectively. The electrodes include at least three floating electrodes, which are electrically isolated with respect to the external contacts. At least two floating electrodes are arranged in the same layer, and each of the floating electrodes overlaps with at least two further electrodes. At least two floating electrodes overlap with one of the non-floating electrodes, respectively. A distance (D1) is defined along a longitudinal axis of the ceramic body between two of the electrodes overlapping with a first floating electrodes, and a distance (D2) is defined perpendicular to the longitudinal axis between the first floating electrode and one of the overlapping electrodes. The distance (D1) is at least twice the distance (D2).

22 Claims, 1 Drawing Sheet

(56) References Cited

U.S. PATENT DOCUMENTS

| | | | | | |
|---|---|---|---|---|---|
| 5,119,062 | A * | 6/1992 | Nakamura | H01C 7/10 338/21 |
| 5,324,986 | A * | 6/1994 | Ueno | H01C 7/10 257/702 |
| 6,147,587 | A * | 11/2000 | Hadano | H01C 7/10 338/21 |
| 6,184,769 | B1 * | 2/2001 | Nakamura | H01C 17/06546 338/21 |
| 8,780,523 | B2 * | 7/2014 | Seo | H01G 4/12 361/321.2 |
| 10,937,575 | B2 * | 3/2021 | Kirk | H01C 1/148 |
| 11,735,340 | B2 * | 8/2023 | Kirk | H05K 1/167 338/21 |
| 2006/0145401 | A1 | 7/2006 | Mihara | |
| 2009/0309691 | A1 * | 12/2009 | Ito | H01C 7/18 338/22 R |
| 2013/0027843 | A1 | 1/2013 | Seo | |
| 2013/0100576 | A1 | 4/2013 | Seo | |
| 2013/0250473 | A1 | 9/2013 | Bultitude | |
| 2017/0005464 | A1 | 1/2017 | Hwang | |
| 2019/0131067 | A1 * | 5/2019 | Berolini | H01G 13/00 |
| 2019/0304636 | A1 * | 10/2019 | Kirk | H01C 7/1006 |

FOREIGN PATENT DOCUMENTS

| | | | |
|---|---|---|---|
| DE | 11 2004 000 186 | B4 | 10/2009 |
| FR | 2542914 | A1 | 9/1984 |
| JP | S54-106894 | A | 8/1979 |
| JP | H05-226116 | A | 9/1993 |
| JP | H08-330107 | A | 12/1996 |
| JP | H10-199709 | A | 7/1998 |
| JP | 2013-089947 | A | 5/2013 |
| JP | 2017-529680 | A | 10/2017 |
| KR | 101578543 | B1 | 12/2015 |

OTHER PUBLICATIONS

Examination Report issued in related Japanese Patent Application No. 2022-513545, dated Jan. 31, 2023 (8 pages).

Examination Report issued in related Chinse Patent Application No. 202080060878.8, in Chinese, dated Dec. 16, 2023 (9 pages).

Appeal Decision issued in related Japanese Patent Application No. 2022-513545, in Japanese, dated Sep. 10, 2024 (19 pages).

* cited by examiner

VARISTOR

RELATED APPLICATIONS

This application is a U.S. National Stage of International Application No. PCT/EP2020/081341 filed on Nov. 6, 2020, which claims the benefit of German Patent Application No. 102019130189.0, filed on Nov. 8, 2019, each of which is hereby incorporated by reference in its entirety.

FIELD OF THE INVENTION

The present invention concerns a varistor.

BACKGROUND OF THE INVENTION

Varistors are ubiquitous electronic components that are used in all kinds of electronic devices, and especially in surge protectors. Varistors exhibit a highly non-linear electrical behaviour that is similar to that of a diode. The varistor voltage, which is a typical characteristic number of a varistor, is a voltage that is required to conduct a current of 1 mA through the varistor. Below the varistor voltage a varistor exhibits a very high electrical resistance, whereas highly above the varistor voltage the electrical resistance is nearly zero.

Most contemporary varistors have a stacked structure, wherein a metal oxide ceramic, that exhibits a non-linear electrical behaviour, is located in between two electrodes. The characteristic varistor voltage is dominantly influenced by the distance between two adjacent electrodes. This is because a metal oxide ceramic is composed of many small grains which exhibit different conductivities. Between the grains boundary layers are formed, which cause a high electrical resistance as the electrons have to pass the potential barriers generated by the boundary layers. By applying a voltage to the electrodes, the electrons gain enough energy to overcome the potential barriers generated by the boundary layers leading to a breakdown of the electrical resistance of the varistor.

U.S. Pat. No. 5,369,390, for example, discloses a multilayer zinc oxide varistor, wherein the varistor voltage is controlled by the thickness of the ceramic material between the electrodes. For a given size of the grains of the metal oxides, the varistor voltage is increased by increasing the distance of the electrode as more grains and consequently more grain boundaries are introduced between the electrodes. Therefore, the varistor voltage can just be increased by increasing the distance between the electrodes. Thereby the height of the whole electronic component is enlarged as most varistors have a stacked structure whereby the height of the electronic component is influenced by the distance of the electrodes.

The object of this invention is to provide a varistor with a high varistor voltage with a flat and compact design.

This object is solved by a varistor having the features of the independent claim.

SUMMARY OF THE INVENTION

The present disclosure specifies a varistor comprising a ceramic body, which comprises a functional ceramic, and electrodes arranged inside the ceramic body. The electrodes include non-floating electrodes, which are electrically connected to external contacts of the varistor, respectively. The electrodes furthermore include at least three floating electrodes, which are electrically isolated with respect to the external contacts. At least two floating electrodes are arranged in the same layer, and each of the floating electrodes overlaps with at least two further electrodes. At least two floating electrodes overlap with one of the non-floating electrodes, respectively. The distance between two of the further electrodes overlapping with one of the floating electrodes is at least twice the distance between this floating electrode and the first further electrode and as the distance between the floating electrode and the second further electrode.

Two of the electrodes overlap with each other, if one of the electrodes extends over and covers a part of another electrode seen by a direction perpendicular to the extension of the electrode. Every floating electrode overlaps with at least two further electrodes whereby at least two of the further electrodes overlap with each other. For the distance between two further electrodes it is preferred to choose the shortest possible distance or otherwise stated, that the distance between the two further electrodes refers to the distance of two neighbouring further electrodes that are located in the same direction seen by the floating electrode. The distance between the two further electrodes overlapping with the floating electrode has to be at least two times the distance each of the further electrodes has from the floating electrode. In this way a charge carrier as an electron cannot move from one further electrode to another further electrode, but is forced to first move from the one further electrode to the floating electrode and hereinafter from the floating electrode to the second further electrode.

By arranging the electrodes in the ceramic body as specified, the charge carrier path through the functional ceramic is elongated as compared to conventional varistors without floating electrodes. In the given arrangement the charge carriers do not just move once from a first non-floating electrode to another non-floating electrode overlapping the first non-floating electrode in a straight line, but are forced to move on a tortuous line through the functional ceramic to reach the second non-floating electrode. The arrangement exploits the space of the varistors in a longitudinal direction more efficiently by creating a larger serial resistance than with a conventional varistor as the charge carriers have to pass multiple times through the functional ceramic compared to varistors providing just a single pass through the functional ceramic between the overlapping first and second non-floating electrode. In the varistor according to the present invention, assuming an embodiment with just three floating electrodes, the path is four times as long as it would be in a conventional varistor without floating electrodes. The charge carrier first has to move from a non-floating electrode through the functional ceramic to the overlapping first floating electrode. From the first floating electrode, the charge carrier travel a second time through the functional ceramic in order to arrive at the overlapping second floating electrode, and a third time to reach the third floating electrode. Afterwards the charge carriers have to travel one more time from the third floating electrode to the overlapping second non-floating electrode. As a consequence, the varistor voltage of a varistor according to the present invention is higher than the varistor voltage of a corresponding usual varistor without floating electrodes.

Additionally, the varistor voltage can be increased and customized comfortably by employing a larger or smaller number of floating electrodes between the non-floating electrodes depending on a required voltage class, process capabilities or the length of the varistor. For example, the varistor voltage can be increased by adding additional floating electrodes and thereby elongating the path of the charge carriers through the functional ceramic even further. Hence, a varistor with an increased varistor voltage at a given component height is provided.

Without limiting the scope of the invention, in the following a direction along which the floating electrodes are arranged and extend is defined as a longitudinal direction. The extension of the ceramic body perpendicular to the longitudinal direction and parallel to the distance between overlapping electrodes is called the height of the varistor.

The floating electrodes overlapping each other may be arranged in two parallel layers along a longitudinal axis of the ceramic body. Arranging the floating electrodes in just two parallel layers allows a design for a varistor which is very thin. The varistor voltage is dependent on the number of floating electrodes and the properties of the functional ceramic, but can be varied without changing the distance between the overlapping electrodes and therefore the height of the varistor.

Furthermore, the floating electrodes may be arranged in multiple parallel layers along a longitudinal axis of the ceramic body. By employing multiple parallel layers of floating electrodes, the current surge capability of the electronic component as well as its capacitance are improved as the effective volume is increased. As a result, a varistor employing multiple parallel layers of floating electrodes is beneficial for applications with high currents and high voltages.

Now turning to the functional ceramic, metal oxides such as zinc oxide, bismuth oxide, chrome oxide or mangan oxide are advantageous for use in a functional ceramic as they show highly non-linear electrical characteristics. Also a mixture of the metal oxides as well as doping of metal oxide can improve the performance of the varistor.

The functional ceramic may also comprise grains. As the varistor voltage or the resistance of the varistor is dominantly influenced by the number of grain boundaries between the electrodes, the properties of the varistor can tuned by adjusting the grains, as the material they are made of or the size of them.

Moreover, the grains may have a diameter between 100 nm and 20 μm. As the varistor voltage is mainly determined by the number of grain boundaries between the electrodes, the diameter of the grains has a high influence on the varistor voltage. At a fixed distance between the electrodes a smaller grain diameter leads to a higher number of grain boundaries and consequently to a higher varistor voltage. The smallest diameter of metal oxide grains is around 100 nm. Typical grain diameters are in the range of 5 μm to 20 μm.

At least two abutting grains may be arranged in series between adjacent electrodes. As the resistance between the adjacent electrodes is determined by the grain boundaries, providing at least two grains between adjacent electrodes in the proper arrangement makes sure that there is at least one grain boundary between the electrodes avoiding any short circuit between the electrodes.

The distance between adjacent electrodes may be between 400 nm and 20 μm. In this way, it is ensured that there are at least two grains in series between adjacent electrodes, whereby the grain diameter can be between 400 nm and 10 μm. Depending on the grain diameter of the functional ceramic, the distance between the electrodes has to be adjusted to provide at least one grain boundary between the electrodes. In this way, a short circuit between the electrodes is prevented and the varistor works properly. As ceramic grains vary widely in size a wide range in the distance may be appropriate.

Further, the electrodes arranged inside the ceramic body may be flat. Flat electrodes, especially thin film electrodes, can be produced by a lot of different techniques. Coating techniques such as vacuum coating, surface coating, lamination or plating are exemplary processes that have been proven to be robust processes to manufacture a film.

Additionally, the electrodes may have a thickness of between 1 and 3 μm. Thicknesses of the electrodes between 1 and 3 μm ensure to retain a small height of the whole electronic component while maintaining a durable and reliable electrode.

The electrodes may comprise silver, palladium, copper, another metal or a combination thereof. Metals provide a high electrical conductivity and therefore are beneficial as a material for electrodes. By employing a good conductor as metal as a material for the electrodes the electrode thickness can be reduced without increasing the resistance of the electrical component. Moreover, the material used for the electrodes should have a thermal expansion coefficient that is as similar as possible to the functional ceramic surrounding the electrode. Also, noble metals as silver or palladium are resistant against corrosion and are therefore beneficial as a metal contact.

Besides, the varistor may be manufactured by multilayer technology. In multilayer technology a component is built by adding layer after layer of the same or different materials. Hence, an arrangement as in the present invention can be readily be made by multilayer technology. The ceramic body can for example be manufactured by thin ceramic foil that are stacked. The electrodes might be screen printed with a metal paste. Also thin film technology can be utilized to produce the varistor with multilayer technology. Very thin ceramic layer may be made with a chemical solution deposition (CSD)-process and the electrodes with a physical vapour deposition (PVD)- or a chemical vapour deposition (CVD)-process.

The height of the ceramic body may be 100 μm or less. Thin film technology allows for electrode thicknesses and functional ceramic film thicknesses of less than a few μm. Thus it is possible to build a varistor with a thickness of less than 100 μm. Varistors as thin as 100 μm are suitable to be integrated into printed circuit boards or other small electronics. Typical heights of varistors often used are smaller than 10 mm. A varistor according to the present invention provides a higher varistor voltage and a higher current surge capability at the same height and is on account of this beneficial for a lot applications and devices.

Moreover, the overlap between the at least one floating electrode and the two further electrodes may be at least 5% and at most 45% of the extension of the floating electrode in a longitudinal direction. In this way the two further electrodes can maintain a distance to each other that is larger than the distance between one of the two further electrodes to the floating electrodes. In addition, the capacitance of the varistor can be customized by varying the overlap of the two further electrodes with the floating electrode as the overlapping electrodes form a capacitance. On top of this, the current surge capability of the varistor can be increased by increasing the overlap of the further electrode and the floating electrode as more floating electrodes can be employed in the finite extension of the ceramic body if the overlap is as high as possible.

Furthermore, the external contacts may be shaped as caps. The caps may coat two opposing front faces of the ceramic body and may reach over the edge of these front faces. In this way, the varistor can be contacted conveniently. A varistor which has external contacts that are shaped as caps can be handily integrated and mounted in applications as the caps allow the varistor to be built in a device as a surface mounted device.

BRIEF DESCRIPTION OF THE DRAWINGS

In the following the invention is described based on embodiments with reference to the figures. The figures serve solely to illustrate the invention and are therefore only schematic and not drawn to scale. Some parts may be exaggerated or distorted in dimension. Therefore, neither absolute nor relative dimensions can be taken from the figures. Identical parts or parts with equivalent effect are referred to by the same reference number.

DETAILED DESCRIPTION OF THE DRAWINGS

Figure 1:
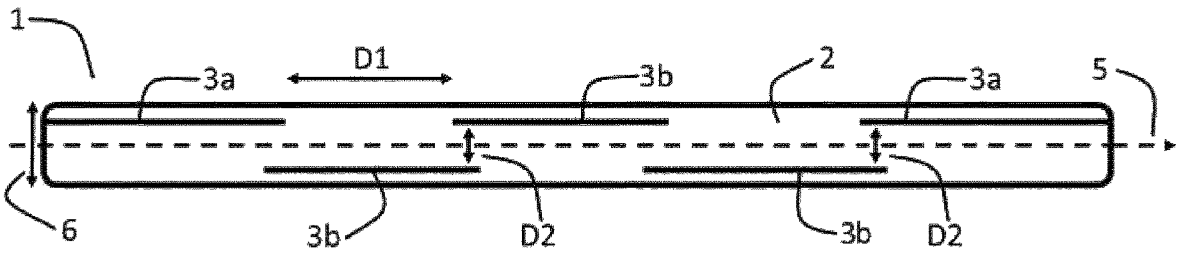
FIG. 1 shows a cross section of a first embodiment of a varistor according to the present invention.

In FIG. 1 a first embodiment of a varistor 1 according to the present invention is shown. Two non-floating electrodes 3*a* protrude into the ceramic body 2 from the two end faces opposing each other along the longitudinal axis 5 of the ceramic body 2. Three floating electrodes 3*b* are provided inside of the ceramic body 2. The first floating electrode 3*b* overlaps with a first non-floating electrode 3*a* and a second floating electrode 3*b*, while the second floating electrode 3*b* overlaps with the first floating electrode 3*b* and the third floating electrode 3*b*, which in turn overlaps with the second non-floating electrode 3*a*. All of the electrodes 3, especially the floating electrodes 3*b*, are arranged in two parallel layers along the longitudinal axis 5 of the ceramic body 2, while two of the floating electrodes 3*b* are arranged in the same layer. This allows for a very thin design of the whole electronic component.

When a voltage applied to the varistor 1 exceeds the varistor voltage, the charge carriers move from the first non-floating electrode 3*a* to the first floating electrode 3*b*, afterwards from the first floating electrode 3*b* through the overlapping region to the second floating electrode 3*b*, then from the second floating electrode 3*b* to the third floating electrode 3*b*, and thereafter from the third floating electrode 3*b* to the second non-floating electrode 3*a*. Therefore the charge carriers have to pass four times the functional ceramic compared to one pass the charge carriers undergo in a conventional varistor 1 where the non-floating electrodes 3*a* overlap each other.

The distances between the electrodes 3 have been chosen such that a distance D1 between adjacent electrodes, i.e. electrodes 3 that are arranged in one and the same layer, is at least twice the distance D2 between overlapping electrodes 3. So the distances between the electrodes 3 obey the following expression: $D1 \geq 2*D2$; In this way, the charge carriers are forced to elongate their path compared to a varistor 1 that just has overlapping non-floating electrodes 3*a* without floating electrodes 3*b*. As the paths through the functional ceramic take similar effects in terms of resistance, the elongated charge carrier path shows the same behaviour as resistors connected in series. In the given arrangement, where the floating electrodes 3*b* are arranged in two parallel layers along one axis, the varistor voltage behaves according to the following expression: $U=2*(n+1)*X$, wherein n is the number of floating electrodes 3*b* and X is a given varistor voltage for just one path through the functional ceramic at a given distance. Hence, the varistor voltage can be comfortably adjusted to a desired voltage class by adding or removing floating electrodes 3*b* in between the non-floating electrodes 3*a*.

The functional ceramic of the ceramic body 2 comprises grains which are predominantly responsible for the resistance between two overlapping electrodes 3 as the resistance is generated by the grain boundaries. The resistance, and therefore the varistor voltage, can be tuned by adjusting the grains' properties such as the material or the diameter of the grains. The grains comprises a metal oxide such as zinc oxide, bismuth oxide, chrome oxide or manganese oxide which show highly non-linear electrical characteristics. Additionally a mixture of the metal oxide as well as doping of the metal oxide can improve the performance of the varistor 1.

Ceramic grains can be produced in a wide range of different diameters ranging from 100 nm to 20 μm. As the varistor voltage and the resistance are caused by the grain boundaries, it is necessary to have at least two abutted grains in series to ensure a grain boundary between adjacent electrodes 3 and to avoid a short circuit between the electrodes 3. Therefore, the distance between two adjacent electrodes 3 has to be, dependent on the grain size in between the electrodes 3, in between 400 nm to 20 μm. Hence, the varistor voltage can be increased not just by adding additional floating electrodes 3*b* in between floating electrodes 3*b*, but also by increasing the distance D2 between overlapping electrodes 3.

The electrodes 3 are shaped as thin films and are flat in a direction of the height 6 of the varistor 1. The thickness of the electrodes 3 can be in between 1 and 3 μm. By using a flat design of the electrodes 3, the height 6 of the whole varistor 1 can be kept small. Various different techniques, such as vacuum coating, surface coating, lamination, plating, or printing can be processes that are suitable for manufacturing the electrodes 3. Metals such as silver, palladium, copper, alloys or a mixture of different metals are suitable as material for the electrodes 3. As metals have a high electrical conductivity, they can be shaped in very thin layers without increasing their resistance. The height 6 of a varistor 1 according to the first embodiment can be just 100 μm or less.

Figure 2:
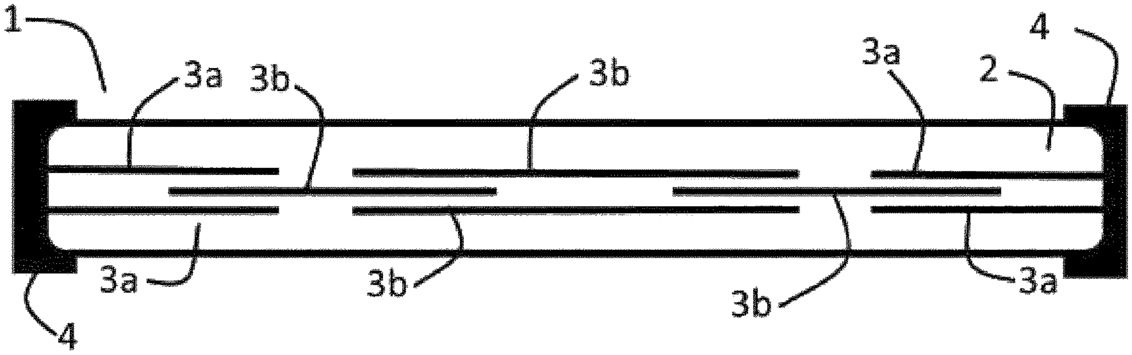
FIG. 2 shows a cross section of a second embodiment of a varistor according to the present invention.

In FIG. 2 a second embodiment of a varistor 1 according to the present invention is shown. The ceramic body 2 is rectangular in shape. Two non-floating electrodes 3*a* protrude into the ceramic body 2 on each of two opposing front ends. Both non-floating electrodes 3*a* overlap with different floating electrodes 3*b*, and both of this floating electrodes 3*b* overlap again with two floating electrodes 3*b* which are located in the middle of the ceramic body 2 stacked upon each other. Therefore, a charge carrier has to move four times through the functional ceramic to get from a non-floating electrode 3*a* from one front end to another non-floating electrode 3*a* on the front end opposing the first front end. Consequently, a varistor 1 according to the second embodiment has a higher varistor voltage than a varistor 1 according to the first embodiment.

In the embodiment shown in FIG. 2 the overlap between two electrodes 3, in particular in between two floating electrodes 3*b*, is much higher than in the first embodiment shown in FIG. 1. In FIG. 1 the overlap between floating electrodes 3*b* is about 10% of the extension of a floating electrode 3*b*, whereas there is about 30% overlap in the second embodiment shown in FIG. 2. As a capacitance is generated by the overlap of the electrodes 3, the capacitance of the second embodiment, which has an overlap that is three times the overlap of the first embodiment, is much higher than the capacitance in the first embodiment shown in FIG. 1. Accordingly, the capacitance of the varistor 1 can be adjusted nearly independent from the varistor voltage as the capacitance is dominantly influenced by the overlap and the varistor voltage is dominantly influenced by the distance D1 of the overlapping electrodes 3, the grain size of the functional ceramic, the material of the functional ceramic and especially by the number of floating electrodes 3*b* that are arranged between the non-floating electrodes 3*a*.

By employing a symmetrical arrangement of the electrodes 3, as in FIG. 2, thermoplastic tensions inside the ceramic body 2 which can occur during thermal manufacture processes as sintering are reduced. Additionally, on both front ends of the ceramic body 2, where the non-floating electrodes 3*a* protrude into the ceramic body 2, the external contacts 4 connected to the external contacts 4 are shaped as caps 4. The cap 4 arranged at a front end is electrically connected to all non-floating electrodes 3*a* protruding into the ceramic body 2 from this side. A varistor 1 with caps 4 can be integrated and mounted comfortably in an application as it is a surface-mounted device. Hence, a varistor 1 with caps 4 can also handily be processed by a pick and place automat.

Figure 3:
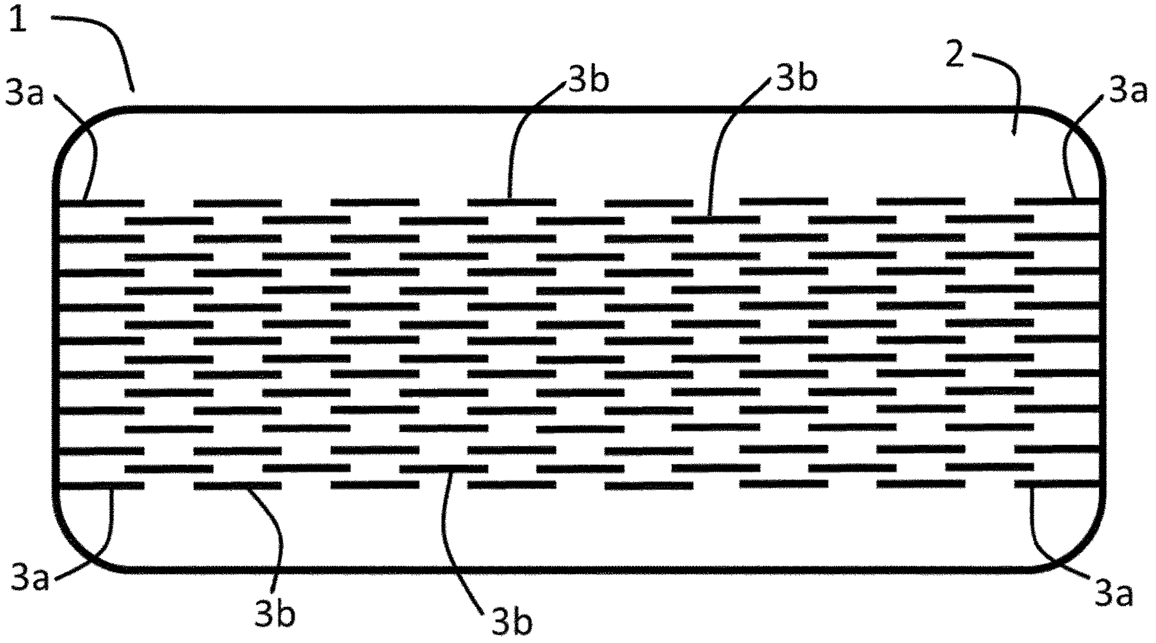
FIG. 3 shows a cross section of a third embodiment of a varistor according to the present invention.

In FIG. 3 a third embodiment of a varistor 1 according to the present invention is shown. In this embodiment the non-floating electrodes 3*a* also protrude into the ceramic body 2 from two front ends opposing each other, whereby in this embodiment nine non-floating electrodes 3*a* protrude from each side. Inside the ceramic body 2 multiple parallel layers of floating electrodes 3*b* are arranged, reaching from one frontend side to the other frontend side along the longitudinal axis 5.

In this embodiment a charge carrier has to travel at least fourteen times through the functional ceramic to get from a non-floating electrode 3*a* at a first front end to a non-floating electrode 3*a* at a second frond end opposing the first. Therefore, the varistor voltage of a varistor 1 according to the third embodiment is much higher compared to the other two embodiments. Furthermore, the current surge capability of the varistor 1 is increased because multiple parallel layers of floating electrodes 3*b* are arranged in the ceramic body 2. By adding additional layers of electrodes 3 the current surge capability can be even increased further. Hence, a varistor 1 according to the third embodiment is not just suitable for applications where a high varistor voltage is needed, but also for applications where high currents occur.

LIST OF USED REFERENCE SYMBOLS

1 varistor
2 ceramic body
3 electrodes
3*a* non-floating electrodes
3*b* floating electrode
4 external contact/cap
5 longitudinal axis
6 height
D1 distance between two further electrodes
D2 distance between two overlapping electrodes

The invention claimed is:

1. A varistor comprising:

a ceramic body comprising a functional ceramic;

electrodes arranged inside the ceramic body, the electrodes including non-floating electrodes that are electrically connected to external contacts of the varistor, respectively, the electrodes further including at least three floating electrodes that are electrically isolated with respect to the external contacts; and wherein the at least three floating electrodes include at least two floating electrodes which are arranged in a same layer, and wherein each of the at least three floating electrode overlaps with at least two of the electrodes including the non-floating electrodes and the at least three floating electrodes, and wherein the at least two floating electrodes of the at least three floating electrodes overlap with one of the non-floating electrodes, and wherein a distance (D1) is defined along a longitudinal axis of the ceramic body between two of the electrodes overlapping with a first floating electrodes of the at least three floating electrodes, and a distance (D2) is defined perpendicular to the longitudinal axis between the first floating electrode and one of the overlapping electrodes, and wherein the distance (D1) is at least twice the distance (D2), and wherein the electrodes are arranged symmetrically, and wherein, thereby, thermoplastic tensions inside the ceramic body, which can occur during thermal manufacture processes as sintering, are reduced.

2. The varistor according to claim 1, wherein floating electrodes of the at least three floating electrodes which overlap each other are arranged in two parallel layers along the longitudinal axis of the ceramic body.

3. The varistor according to claim 1, wherein floating electrodes of the at least three floating electrodes are arranged in multiple parallel layers along a longitudinal axis of the ceramic body.

4. The varistor according to claim 1, wherein the functional ceramic comprises metal oxide.

5. The varistor according to claim 4, wherein the functional ceramic comprises grains.

6. The varistor according to claim 5, wherein the grains have a diameter between 100 nm and 20 μm.

7. The varistor according to claim 6, wherein at least two abutting grains are arranged in series in between adjacent electrodes.

8. The varistor according to claim 1, wherein the distance between adjacent electrodes is between 400 nm and 20 μm.

9. The varistor according to claim 1, wherein the electrodes arranged inside the ceramic body are flat.

10. The varistor according to claim 5, wherein the non-floating electrodes and/or the at least three floating electrodes have a thickness between 1 and 3 μm.

11. The varistor according to claim 1, wherein the electrodes comprise silver, palladium, copper, another metal or a combination thereof.

12. The varistor according to claim 1, wherein the varistor is manufactured by multilayer technology.

13. The varistor according to claim 1, wherein the height of the ceramic body measured perpendicular to the longitudinal axis is 100 μm or less.

14. The varistor according to claim 1, wherein the overlap between at least one floating electrode and the two further electrodes is at least 5% and at most 45% of the extension of the floating electrode in direction of the longitudinal axis.

15. The varistor according to claim 1, wherein the external contacts are shaped as caps.

16. The varistor according to claim 1, wherein the thickness of the ceramic body is 100 μm or less, and the thickness of the electrodes is between 1 and 3 μm, a number of electrode layers is less than the ceramic body thickness divided by the electrode thickness.

17. The varistor according to claim 1, further including metal oxide grains, the diameter of metal oxide grains is in the range of 5 μm to 20 μm.

18. The varistor according to claim 17, wherein the metal oxide grains are selected from zinc oxide, bismuth oxide, chrome oxide or manganese oxide that show highly non-linear electrical characteristics, and wherein a mixture of the metal oxide as well as doping of the metal oxide improves the performance of the varistor.

19. The varistor according to claim 1, wherein the ceramic body is rectangular in shape, two non-floating electrodes protrude into the ceramic body on each of two opposing ends, both non-floating electrodes overlap with different floating electrodes of the at least three floating electrodes, and the floating electrodes which overlap with the non-floating electrodes overlap again with two other floating electrodes of the at least three floating electrodes that are located in a middle region of the ceramic body and stacked upon each other.

20. The varistor according to claim 1, wherein nine non-floating electrodes protrude into the ceramic body from the first and second opposing ends, and wherein, inside the ceramic body, multiple parallel layers of floating electrodes are arranged along the longitudinal axis from the first end to the second end.

21. A varistor comprising:

a ceramic body comprising a functional ceramic, the functional ceramic including grains;

electrodes arranged inside the ceramic body, the electrodes including non-floating electrodes that are electrically connected to external contacts of the varistor, respectively, the electrodes further including at least three floating electrodes that are electrically isolated with respect to the external contacts; and wherein the at least three floating electrodes include at least two floating electrodes which are arranged in a same layer, and wherein each of the at least three floating electrode overlaps with at least two of the electrodes including the non-floating electrodes and the at least three floating electrodes, and wherein the at least two floating electrodes of the at least three floating electrodes overlap with one of the non-floating electrodes, and wherein a distance (D1) is defined along a longitudinal axis of the ceramic body between two of the electrodes overlapping with a first floating electrodes of the at least three floating electrodes, and a distance (D2) is defined perpendicular to the longitudinal axis between the first floating electrode and one of the overlapping electrodes, and wherein the distance (D1) is at least twice the distance (D2), and wherein at least two abutting grains are arranged in series in between adjacent electrodes.

22. A varistor comprising:

a ceramic body comprising a functional ceramic;

electrodes arranged inside the ceramic body, the electrodes including non-floating electrodes that are electrically connected to external contacts of the varistor, respectively, the electrodes further including at least three floating electrodes that are electrically isolated with respect to the external contacts; and wherein the at least three floating electrodes include at least two floating electrodes which are arranged in a same layer, and wherein each of the at least three floating electrode overlaps with at least two of the electrodes including the non-floating electrodes and the at least three floating electrodes, and wherein the at least two floating electrodes of the at least three floating electrodes overlap with one of the non-floating electrodes, and wherein a distance (D1) is defined along a longitudinal axis of the ceramic body between two of the electrodes overlapping with a first floating electrodes of the at least three floating electrodes, and a distance (D2) is defined perpendicular to the longitudinal axis between the first floating electrode and one of the overlapping electrodes, and wherein the distance (D1) is at least twice the distance (D2), and wherein the overlap between at least one floating electrode of the at least three floating electrodes and the two further electrodes is at least 5% and at most 45% of the extension of the floating electrode in direction of the longitudinal axis, wherein a capacitance of the varistor is customized by varying the overlap of the at least two further electrodes with the respective floating electrode.

* * * * *